United States Patent [19]

Choiniere et al.

[11] Patent Number: 5,400,845
[45] Date of Patent: Mar. 28, 1995

[54] TECHNIQUE FOR FASTENING LOGS AND FASTENER THEREFOR

[75] Inventors: Stanley W. Choiniere, Southwick; Hubert T. McGovern, Westerfield; Robert W. Chauvin, Jr., Feeding Hills, all of Mass.

[73] Assignee: Olympic Manufacturing Group, Inc., Agawam, Mass.

[21] Appl. No.: 994,134

[22] Filed: Dec. 21, 1992

[51] Int. Cl.6 .......................... B27F 7/00; F16B 23/00
[52] U.S. Cl. .......................................... 144/353; 52/233;
29/469.5; 29/525.1; 144/329; 144/344;
411/387; 411/399; 411/914
[58] Field of Search ........................... 29/469.5, 525.1;
52/233, 595; 144/329, 344, 353; 411/184, 187,
387, 399, 914

[56] References Cited

U.S. PATENT DOCUMENTS

| | | | |
|---|---|---|---|
| 4,074,011 | 2/1978 | Teramae et al. | 411/914 X |
| 4,114,505 | 9/1978 | Loeser et al. | 411/914 X |
| 4,275,541 | 6/1981 | Orals et al. | 411/387 X |
| 4,480,951 | 11/1984 | Regensburger | 411/387 |
| 4,503,648 | 3/1985 | Mahaffey | 52/233 |
| 4,655,661 | 4/1987 | Brandt | 411/387 |
| 4,697,969 | 10/1987 | Sparkes | 411/387 |
| 4,903,447 | 2/1990 | McDade | 52/595 X |
| 4,909,012 | 3/1990 | Thompson, Jr. et al. | 52/233 |
| 5,163,259 | 11/1992 | Hunsaker et al. | 52/595 X |

FOREIGN PATENT DOCUMENTS

| | | | |
|---|---|---|---|
| 3344048 | 6/1984 | Germany | 411/399 |
| 52-44366 | 4/1977 | Japan | 411/387 |

Primary Examiner—W. Donald Bray
Attorney, Agent, or Firm—Chilton, Alix & Van Kirk

[57] ABSTRACT

A technique for fastening together logs and a fastener therefor is directed to a self-drilling/tapping fastener which allows the fastener to be driven through the log to be secured without pre-drilling a bore. Counter-bore fins on the fastener head also form a counter-bore for the head. A lubricious coating applied to a portion of the shank accommodates settling of the logs and facilitates installation.

12 Claims, 2 Drawing Sheets

TECHNIQUE FOR FASTENING LOGS AND FASTENER THEREFOR

BACKGROUND OF THE INVENTION

This invention relates generally to fasteners and fastening techniques for fastening logs. More particularly, the present invention relates to techniques and fasteners for fastening together the logs of a log home.

Log homes which are manufactured from pre-shaped logs formed in an efficient, mass production process are now commonplace. The pre-formed logs are transported to the building site, and the log home is constructed in a highly efficient process. The construction process conventionally involves fastening together the logs which form the walls of the home. Because the logs have a substantial thickness, typically on the order of 6 inches or more, and because over time there is ordinary significant settling and displacement of the connected logs subsequent to construction, the fastening process is not entirely straightforward.

A wide spread conventional log fastening technique involves drilling a hole in the log that is to be secured on top of a bottom secured log. A counter-sink is also drilled. After the hole and counter-sink are formed, a large spiral nail or a common nail is driven through the hole into the bottom securing log, or a long screw is inserted through the pre-drilled hole and threaded into the bottom log. The fastener head is driven into the counter-sink. In log construction a limited free movement of the logs must be accommodated since over the lifetime of the log home, the logs ordinarily will shrink and will also settle. In addition, the fastening technique must be accomplished without splitting the logs.

SUMMARY OF THE INVENTION

Briefly stated the invention in a preferred form is a technique for fastening together the logs which are used to construct log homes. Rather than pre-drill a bore and a counter-bore in the log to be secured, a fastener is torqued into the secured log by a self-drilling/tapping process which prevents splitting of the log and also, at the same time, forms the counter-sink bore. The fastener is configured to allow for limited movement of the logs due to shrinkage and settling.

In accordance with the invention, the log fastener includes a head which is adapted to receive a driver for application of a torque. A shank extends from the head and terminates in a self-drilling piercing point. The shank has a first segment of generally uniform diameter and a second threaded section which threads into the secured log. The fastener includes a pair of fins under the head which upon torquing the fastener, self-tap the counter-bore so that the head may be sunk below the surface of the log. A lubricious coating is applied to the shank to allow for settling of the logs. The coating also eliminates a significant amount of friction and thereby reduces the torque required during installation.

An object of the invention is to providing a new and improved technique and fastener for fastening together pre-formed building logs.

Another object of the invention is to provide a new and improved fastening technique and fastener which allow pre-formed logs to be connected in a highly efficient and cost effective manner.

A further object of the invention is to provide a new and improved technique wherein logs may be fastened together in an efficient manner which allows for subsequent settling and movement of the logs and does not result in splitting of the logs or compromising their structural integrity.

Other objects and advantages of the invention will become apparent from the drawings and the specification.

DETAILED DESCRIPTION OF THE PREFERRED EMBODIMENT

Figure 1:
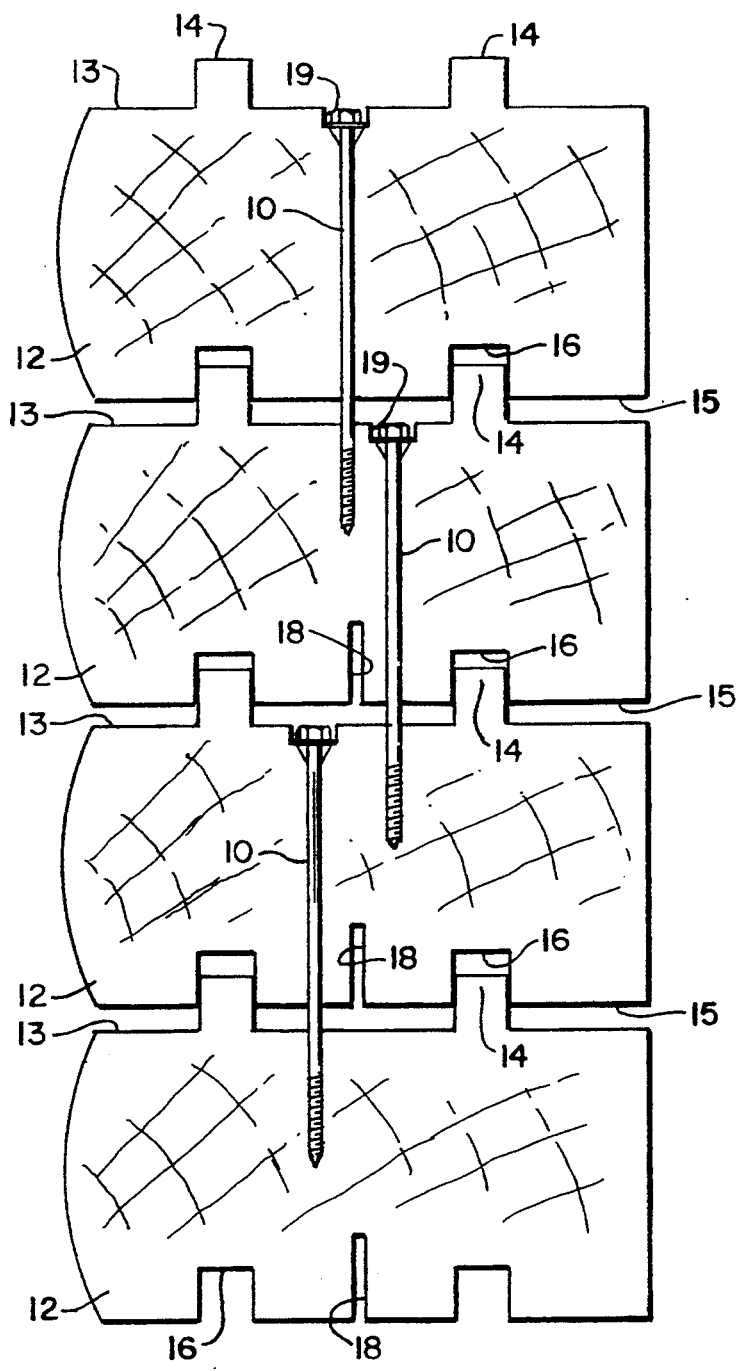
FIG. 1 is a schematic view illustrating logs which have been connected together by fasteners in accordance with the present invention.

With reference to the drawings wherein like numerals represent like parts throughout the Figures, a log fastener in accordance with the present invention is generally designated by the numeral 10. Log fastener 10 is especially adapted for fastening together adjacent pre-formed logs such as may be employed in constructing a log home. The logs 12, which are prototypically illustrated in FIG. 1, may assume a wide variety of shapes and configurations. The logs 12 typically have substantial thicknesses which may commonly be on the order of 6, 8, 10 inches or even greater thicknesses. The logs are formed in an efficient, mass produced process which includes a generally uniform shaping so as to produce generally uniformly spaced upper and lower planar surfaces 13, 15. The logs also typically have various tongues 14, grooves 16, slots 18 and notches (not illustrated) which are used in the construction process.

Figure 2:
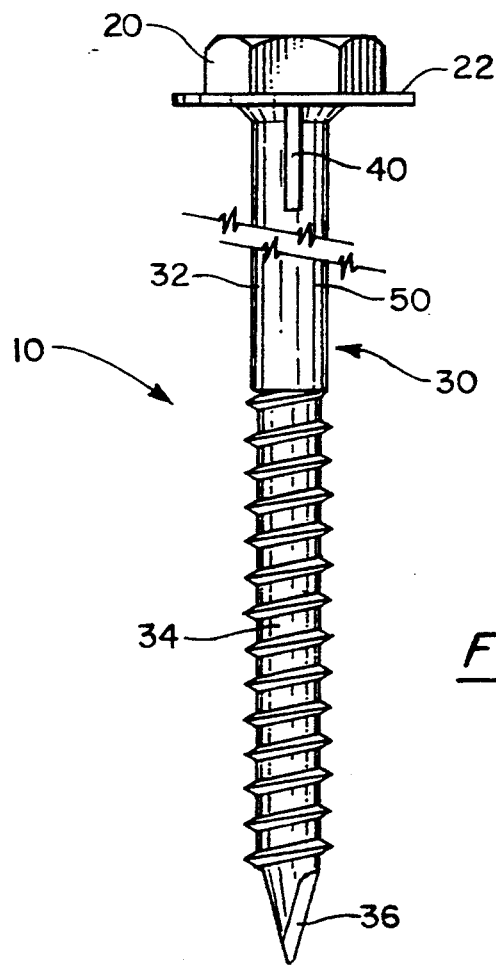
FIG. 2 is an enlarged elevational frontal view, partly broken away, of a fastener in accordance with the present invention.
Figure 4:
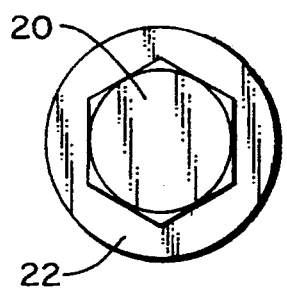
FIG. 4 is a top plan view of the fastener of FIG. 1.
Figure 3:
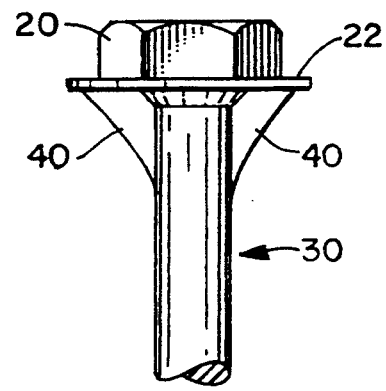
FIG. 3 is an enlarged fragmentary view of the fastener of FIG. 2 viewed from the right thereof.

With reference to FIGS. 2 through 4, fastener 10 includes a hex head 20 with an integral retainer or flange 22 and a shank 30. The shank 30 is comprised of an intermediate segment 32 having a substantially uniform diameter. Segment 32 is axially dimensioned to extend substantially the entire thickness of the log. The shank also includes a threaded portion 34 which typically axially extends a distance on the order of 2 inches. The shank terminates in a piercing point 36 for self-drilling the fastener into the log. A pinch-type drill point is illustrated in the drawings. However, other drill tip configurations are also possible.

In addition, a pair of diametrically opposed fins 40 project downwardly until the fins and head engage the top of the log at the underside of the head. The fins 40 are configured so that upon torquing the fastener, the fins drill a counter-bore. The head 20 may thus be countersunk into the secured log as part of the fastener driving process.

After the fastener has been fabricated, the shank 30 is preferably coated with a lubricious coating 50 (partially illustrated). The coating 50 aids in the installation by lessening the friction during the installation process. In addition, the lubricious coating 50 will allow the logs to settle by providing a limited degree of lubricated movement along the fastener shank. In the preferred form, the lubricious coating is a Xylan TM coating which contains Teflon TM and is applied via a fluorocarbon.

With reference to FIG. 1, the logs 12 are fastened together by applying a torque to the fasteners 10 without initially predrilling either a through bore or a counter-bore into the log to be secured. Preferably, a fastener holder attachment is used in conjunction with an automatic screw gun (neither illustrated). The preferred attachment is the Olympic Speedy Tool which is marketed by the assignee of the present invention. The attachment supports the fastener so that a sufficient downward force is exerted on the fastener for threading the fastener through the secured log and into the securing log. The fastener self-drills and self-taps into log 12, and as it does so, forms a bore which is dimensioned to receive the shank segment 32. As the fastener is driven downwardly, the fins 40 also function to form a counter-bore 19 for sinking the head below the top of the log. The shank segment 32 and the threaded portion 34 are dimensioned so that the fastener only threadably engages the base (bottom) log when the fastener is fully driven. The lubricious coating 50 facilitates the installation process.

It should be appreciated that because pre-drilling a bore and counter-bore is not required, a significant savings in installation time and labor cost is provided by the fastener.

Figure 5:
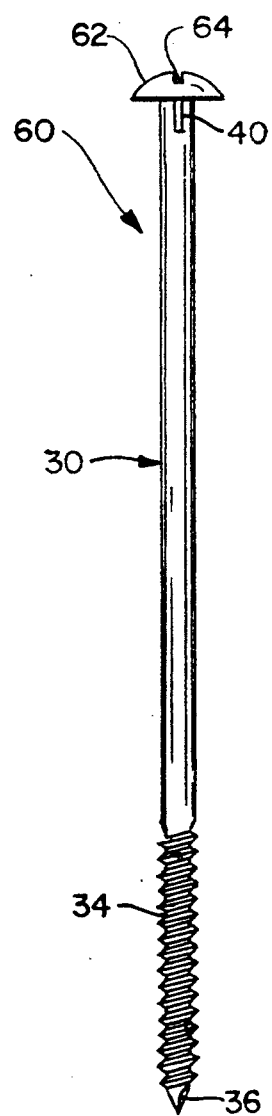
FIG. 5 is a top plan view of a second fastener in accordance with the present invention.

With reference to FIG. 5, an alternate embodiment of a log fastener is generally illustrated by the numeral 60. Fastener 60 primarily differs from fastener 10 by virtue of the head 62 which has a rounded configuration and a slot 64 for a blade driver (not illustrated). Alternately, the head 62 may also include a flat, bugle or truss-type configuration.

In one embodiment of the invention which is adapted for a log having a nominal thickness of approximately 8 inches, the length of the shank 30 is approximately 8 inches. The length of the threaded segment is approximately 2 inches. The diameter of the flange 22 is approximately 0.400 inches. The diameter of the intermediate shank segment 32 is approximately 0.189 inches. The root diameter of the threaded portion is 0.172 and the thread diameter is 0.240 inches.

While a preferred embodiment of the foregoing invention is set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fastener for fastening together a pair of logs having a substantial pre-established thickness comprising:
   a head comprising means for receiving a torque applied thereto;
   a shank extending from said head, said shank having a first segment of generally uniform diameter and a second threaded section, said shank terminating in a piercing point for self-drilling said fastener, said first shank segment having a longitudinal dimension substantially commensurate with the thickness of said log;
   counter-bore means adjacent said head for drilling a counter-bore for said head upon application of a torque to said head; and
   a lubricious coating applied to said shank.

2. The fastener of claim 1 wherein said counter-bore means comprises a pair of substantially identical fins.

3. The fastener of claim 1 wherein said head comprises a washer-like flange.

4. The fastener of claim 1 wherein said threaded segment is approximately 2 inches.

5. A log assembly comprising:
   a first log having a pre-established thickness and means defining a bore and a counter-bore;
   a second log; and
   a fastener fastening said first log to said second log, said fastener comprising a shank extending through said bore and having a threaded portion which is engaged in said second log and a segment of generally uniform diameter which extends substantially the entire thickness of said first log, a lubricious coating applied to said shank, said fastener comprising a head fully received in said counter-bore and fin means comprising a pair of fins extending at the underside of said head for forming the counter-bore.

6. The log assembly of claim 5 wherein said counter-bore has an end and said head comprises a washer-like flange engaging the end of the counter-bore.

7. The log assembly of claim 5 wherein said threaded portion extends a distance of approximately 2 inches.

8. The log assembly of claim 5 wherein said shank comprises a drilling point for self-tapping said fastener.

9. A technique for fastening together two logs comprising:
   (a) providing a fastener having a self-tapping point, a distal threaded portion, an intermediate shank segment of generally uniform diameter which extends substantially the entire thickness of the first of said logs, a head and counter-bore forming means adjacent said head comprising a pair of fins; and
   (b) without pre-drilling a bore for said fastener, rotatably driving said fastener through said first log so that said fastener thread engages said second log, said counter-bore means drills said counter-bore while said fastener is being rotatably driven and said head is countersunk in said counter-bore.

10. The fastening technique of claim 9 further comprising pre-applying a lubricious coating to said shank segment.

11. The fastening technique of claim 9 wherein step (b) further comprises applying a torque to said head.

12. The fastening technique of claim 9 wherein said fastener is driven so that the fastener thread only engages said second log when the head is countersunk in said counter-bore.

* * * * *